Patented May 9, 1950

2,507,048

UNITED STATES PATENT OFFICE 2,507,048

PURIFYING CRUDE ACETOPHENONE

Frank Porter, Morristown, and John N. Cosby, Morris Plains, N. J., assignors to Allied Chemical & Dye Corporation, New York, N. Y., a corporation of New York No Drawing. Application March 4, 1946, Serial No. 651,978

3 Claims. (Cl. 260—592)

This invention relates to a process for the purification of a crude acetophenone produced by the oxidation of ethylbenzene.

It is known that by intimately contacting an oxygen gas with liquid ethylbenzene at elevated temperatures the ethylbenzene may be oxidized to form partial oxidation products including substantial quantities of acetophenone. It is known to recover acetophenone from the crude reaction product of the ethylbenzene oxidation by distilling that product and collecting the fraction containing the acetophenone. The acetophenone thus recovered by fractional distillation is, however, contaminated by genetic impurities (i. e. materials which are formed together with the acetophenone in the process of oxidizing the ethylbenzene) which are vaporized at substantially the same temperatures as the acetophenone is vaporized and which it is very difficult, if not impossible, to separate from the acetophenone by fractional distillation.

It is an object of this invention to provide a process which is particularly effective to purify acetophenone of materials distilling from an impure acetophenone at similar temperatures to those at which the acetophenone distills, and are thus difficultly separable from the acetophenone by fractional distillation. We have discovered that if the acetophenone produced by the oxidation of ethylbenzene is vaporized and, accompanied by these like-boiling, genetic impurities, is passed at elevated temperatures at which the acetophenone is in the vapor phase in contact with a dehydration catalyst and the thus treated acetophenone is fractionally distilled, a cut may be taken off in this fractional distillation which contains acetophenone accompanied by a much smaller amount of impurities than is recoverable by similarly fractionally distilling the impure acetophenone without having subjected it to this vapor phase treatment in contact with the dehydration catalyst.

The process of this invention comprises vaporizing acetophenone produced by the oxidation of ethylbenzene and accompanied by like-boiling impurities and passing the vapor mixture thus obtained at temperatures above the condensation temperature of the acetophenone in contact with a dehydration catalyst. Vapors of the thus treated acetophenone are rectified to recover a fraction containing relatively pure acetophenone as compared with the crude acetophenone subjected to treatment by contact with the dehydration catalyst.

Any material active to catalyze the dehydration of alcohols with water being split off from the alcohol, may be employed for the treatment of the impure acetophenone. We preferably use the solid oxide dehydration catalysts, such as alumina, thoria or silica. The temperatures at which the impure acetophenone is contacted with the dehydration catalyst may, in general, be within the range of temperatures at which the catalyst is known to be active to promote the dehydration of alcohols. Temperatures high enough to cause undue decomposition of the acetophenone should not be used. For example, using alumina it is undesirable to contact the acetophenone with the catalysts at temperatures greatly above 400° C., since it is known that at such elevated temperatures acetophenone reacts to form a triphenyl benzene. The time of contact may be varied widely and will depend upon the activity of the specific catalyst used and the temperature at which the impure acetophenone vapors are contacted therewith. In general, it is preferred to operate at temperatures moderately above the boiling point of acetophenone and to limit the time of contact to that required by the particular catalyst employed to give a product in which the impurities accompanying the acetophenone have substantially different boiling points from acetophenone so that they are separable therefrom by fractional distillation.

The impure acetophenone subjected to the catalytic treatment step of this invention may be the material vaporized at temperatures in the neighborhood of 200° C. from the crude oxidation product of ethylbenzene. Since acetophenone has a boiling point of 202° C., these vapors will contain the acetophenone of the crude oxidation product together with close boiling impurities. The amount of material contacted with the dehydration catalyst may be limited by rectifying the vapors distilled from the crude oxidation product and separately recovering for the catalytic treatment a relatively narrow boiling fraction of these vapors in which the acetophenone is concentrated, e. g. a fraction distilled over temperatures of about 190° to 202° C. If desired, the crude oxidation product first may be washed with an alkaline solution such as a caustic soda solution to remove materials soluble therein, particularly benzoic acid. The insoluble portion containing the acetophenone then may be heated to vaporize the acetophenone and the vapors passed in contact with the dehydration catalyst.

The following example is illustrative of one embodiment of our invention:

Ethylbenzene was oxidized in the liquid phase by means of air at 150° C. and the crude oxidation product distilled with rectification of the vapors in a rectifying column containing about 5 to 8 equivalent theoretical plates operated with reflux ratios of about 3:1 to 6:1. The fraction distilled over at top of column temperatures of about 190° to 200° C., was separately collected and was found to contain about 82% acetophenone.

This crude acetophenone was vaporized and passed through a bed of activated alumina heated to 300° C. at the rate of about 1 gram of the crude acetophenone per hour for every 1 cc. of catalyst. The vapors leaving the catalyst bed were condensed and the condensate thus obtained fractionally distilled under a pressure of 20 mm. Hg with rectification of the vapors in a column containing about 25–30 equivalent theoretical plates and with a reflux ratio of about 15:1. 61% of the crude acetophenone charged to the distillation apparatus was recovered as distillate fractions having freezing points above 17.5° C. and thus containing 95% or more acetophenone. About 32% of the crude acetophenone was recovered as distillate fractions having freezing points of 19.2° C. or higher and thus containing 99% or more acetophenone.

By way of contrast with the results thus obtained, a portion of the same 82% crude acetophenone was fractionally distilled in the same apparatus and under the same conditions but without having been passed in contact with the dehydration catalyst. In this case about 42% of the charge was recovered as product with freezing points above 17.5° C. and containing 95% or more acetophenone. No fraction was obtained with a freezing point above 19° C. and thus representing acetophenone of 99% or higher purity.

We have further discovered that the acetophenone in a crude ethylbenzene oxidation product may be recovered as a substantially pure product in particularly high yields by a process combining the catalytic treatment and distillation of the catalytically treated crude acetophenone heretofore described with a purification by fractional freezing. In carrying out this process, the crude ethylbenzene oxidation product or the portion thereof insoluble in aqueous alkaline solutions is fractionally distilled to recover a fraction in which the acetophenone is concentrated and containing substantially more than 50% acetophenone. This crude acetophenone is melted, if necessary, and the liquid cooled to crystallize a portion only of the liquid, e. g. until about 50–60% of the material is solidified. The solid is separated from the liquid in a centrifuge. The solid thus recovered is acetophenone of a substantially higher purity than the crude acetophenone from which it is obtained. By repeatedly further cooling the liquid separated from the solid, additional purified acetophenone may be recovered therefrom. By remelting the purified acetophenone products recovered by fractional freezing from the initial crude acetophenone and again fractionally freezing the remelted material, with separation of the crystallized portion from the liquid, products of increased purity are obtained.

The impurities in the crude acetophenone accumulate in the liquid fractions obtained in the various steps of the fractional freezing. When the liquids contain sufficient impurities to reduce their freezing points to −4° to −5° C., no further separation of purified acetophenone is obtainable since a liquid of this melting point containing about 45–50% acetophenone represents a eutectic mixture of acetophenone and the impurities.

We have found that the recovery in high yields of a pure acetophenone by such a fractional freezing process is greatly facilitated by subjecting either the eutectic mixture produced by the fractional freezing method or the impure liquids of freezing points above −4° to −5° separated from the crystallized acetophenone to the catalytic dehydration treatment and rectification of the catalytically treated material to recover a fraction containing the acetophenone. The thus purified material is returned to a suitable step of the fractional freezing procedure in which acetophenone is crystallized and separated from a liquid fraction in which the impurities are concentrated. By thus catalytically treating the impure liquid residues of the fractional freezing procedure, removal of accumulating impurities is accomplished and an acetophenone concentrate which may be treated particularly effectively by fractional freezing to recover pure acetophenone is obtained. If desired, the initial crude acetophenone vapors recovered from the ethylbenzene oxidation product may be subjected to the catalytic treatment and rectification to purify them before the acetophenone fraction is subjected to fractional freezing.

This combination process is illustrated by the following example:

The crude oxidation product prepared by treating ethylbenzene in liquid phase with air is fractionally distilled and a fraction containing about 92.5% acetophenone recovered therefrom. This crude liquid acetophenone is cooled to 11° C. and the solid which crystallizes is separated from the liquid. About 59.5% of the solid treated is obtained as crystals with a melting point of 19.2° C. representing an acetophenone of about 99% purity. The separated liquid is cooled to 5° C., at which temperature crystals are formed amounting to about half of the weight of the liquid and are centrifuged from the remaining liquid. By remelting these crystals and cooling the melt to 15° C. a crop of crystals is recovered having a melting point of 19.5° C. and thus containing almost 100% acetophenone.

The mother liquor obtained in cooling to 5° C. the liquid from the first crystallization, is further cooled to −5° C. and the crop of crystals thus obtained is separated from the liquid, remelted and added to the liquid obtained in cooling the remelted and recrystallized solid as described in the preceding paragraph. By cooling this combined material to 10° C. a crop of crystals is obtained and separated from the liquid. These crystals have a melting point of 18.8° C. corresponding to an acetophenone of about 98% purity. This material is combined with the two crystal products with melting points of 19.2° C. and 19.5° C. obtained as described above, to give a product representing a recovery of about 80% by weight of the initial crude acetophenone as a 99% pure acetophenone with a melting point above 19° C.

The liquid removed from the crystals formed by recrystallizing liquid at 10° as described above, is cooled to 3° C. to yield a small crop of crystals containing about 91% acetophenone and a liquid which is combined with the liquid obtained in the above step in which liquid is cooled to −5° C. The combined liquids are vaporized and the vapors passed in contact with activated alumina at 300° C. at the rate of about 1 gram of the crude acetophenone material per hour per cc. of catalyst. The thus treated vapors are cooled to condense the acetophenone. The condensate is then fractionally distilled at 20 mm. Hg pressure with rectification of the vapors in a column containing about 25-30 equivalent theoretical plates with a reflux ratio of about 15:1. Practically all of the acetophenone in the crude product subjected to the catalytic treatment may be recovered in this fractional distillation as a fraction containing 90% or more acetophenone. This fraction is subjected to the fractional freezing procedure described above either separately or combined with additional crude acetophenone recovered by fractional distillation of ethylbenzene oxidation product and with the above solid containing about 91% acetophenone obtained in the fractional freezing procedure.

We claim:

1. The process for recovering acetophenone from the crude product containing the same together with genetic impurities formed with acetophenone by the liquid phase oxidation of ethylbenzene by means of an oxygen gas, which comprises fractionally distilling said crude oxidation product and recovering that fraction containing the acetophenone accompanied by a minor proportion of like-boiling impurities, cooling a melt of said acetophenone fraction to a temperature at which a portion only of the acetophenone in said melt is crystallized and impurities present are concentrated in the remaining liquid portion of the melt, separating the crystallized acetophenone from the liquid, vaporizing said liquid, passing these vapors in contact with a dehydration catalyst, rectifying vapors of thus catalytically treated material to recover therefrom a purified acetophenone fraction, cooling a melt of impure acetophenone containing said purified acetophenone fraction to a temperature at which a portion only of the acetophenone in said melt is crystallized and impurities present are concentrated in the remaining liquid portion of the melt, and separating the crystallized acetophenone from the liquid.

2. The process for recovering acetophenone from the crude oxidation product containing the same together with genetic impurities formed with acetophenone by the liquid phase oxidation of ethylbenzene by means of an oxygen gas which comprises fractionally distilling said crude oxidation product and recovering that fraction containing the acetophenone accompanied by a minor proportion of like-boiling impurities, subjecting a melt of said fraction to fractional freezing at temperatures at which a portion only of the acetophenone in the melt is crystallized and impurities present are concentrated in the remaining liquid portion of the melt, separating the crystallized acetophenone from the liquid, vaporizing said liquid, passing these vapors in contact with a dehydration catalyst, rectifying vapors of thus catalytically treated material to recover therefrom an acetophenone fraction accompanied by a minor proportion of like-boiling impurities, mixing a melt of said last mentioned acetophenone fraction with said melt of acetophenone and accompanying impurities recovered from said crude oxidation product and subjected to the aforedescribed purification by fractional freezing, and by said fractional freezing recovering purified acetophenone crystallized from the mixture of these two melts.

3. The process for recovering acetophenone from the crude oxidation product containing the same together with genetic impurities formed with acetophenone by the liquid phase oxidation of ethylbenzene by means of an oxygen gas, which comprises fractionally distilling said crude oxidation product and recovering therefrom a crude acetophenone fraction containing acetophenone accompanied by a minor proportion of like-boiling genetic impurities, recovering purified acetophenone from said fraction of crude acetophenone by fractional crystallization from melts of said crude acetophenone fraction and of partially purified acetophenone crystallized therefrom by cooling each of said melts to temperatures at which only a portion thereof crystallizes as solid leaving a portion of the melt as a liquid fraction containing a lower concentration of acetophenone than that in the melt prior to cooling and separating the liquid fraction from the solid crystallized therefrom, vaporizing thus separated liquid fraction, passing the vapors thus obtained in contact with a dehydration catalyst, rectifying vapors of thus catalytically dehydrated material to recover therefrom an acetophenone fraction accompanied by a minor proportion of like-boiling impurities, and recovering from a melt of said last mentioned acetophenone fraction a purified acetophenone by the aforedescribed process of fractional cvrystallization of purified acetophenone from a melt containing acetophenone and genetic impurities.

FRANK PORTER.
JOHN N. COSBY.

REFERENCES CITED

The following references are of record in the file of this patent:

UNITED STATES PATENTS

| Number | Name | Date |
|---|---|---|
| 1,813,606 | Binapfl | July 7, 1931 |
| 2,245,528 | Loder | June 10, 1941 |
| 2,291,915 | Palmer | Aug. 4, 1942 |
| 2,345,625 | Palmer | Apr. 4, 1944 |
| 2,376,674 | Emerson | May 22, 1945 |

OTHER REFERENCES

Yamamoto, Jour. Soc. Chemical Ind., Japan, Sept. 1940, pages 279B-280B.